US010632927B2

(12) United States Patent
Dozeman et al.

(10) Patent No.: US 10,632,927 B2
(45) Date of Patent: Apr. 28, 2020

(54) DIFFRACTION PATTERN REDUCTION

(71) Applicant: GENTEX CORPORATION, Zeeland, MI (US)

(72) Inventors: Gary J. Dozeman, Zeeland, MI (US); David J. Cammenga, Zeeland, MI (US); William L. Tonar, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 29 days.

(21) Appl. No.: 15/911,679

(22) Filed: Mar. 5, 2018

(65) Prior Publication Data
US 2019/0270411 A1 Sep. 5, 2019

(51) Int. Cl.
B60R 1/12 (2006.01)
B60R 1/02 (2006.01)

(52) U.S. Cl.
CPC ............ B60R 1/12 (2013.01); B60R 1/02 (2013.01); B60R 2001/1215 (2013.01)

(58) Field of Classification Search
CPC ........................... B60R 1/12; B60R 1/02
See application file for complete search history.

(56) References Cited

U.S. PATENT DOCUMENTS

| 3,708,222 A | 1/1973 | Stern |
| 2005/0134983 A1 | 6/2005 | Lynam |
| 2009/0015736 A1* | 1/2009 | Weller .................. B60R 1/12 349/11 |
| 2009/0080055 A1 | 3/2009 | Baur et al. |
| 2014/0049822 A1* | 2/2014 | Gollier ................ G02B 5/0236 359/488.01 |

FOREIGN PATENT DOCUMENTS

WO 2017 210513 A1 12/2017

OTHER PUBLICATIONS

International Search Report dated Nov. 29, 2018, received in corresponding U.S. Appl. No. 18/020,869, 3 pages.
Written Opinion of the International Searching Authority dated Nov. 29, 2018, received in corresponding U.S. Appl. No. 18/020,869, 5 pages.

* cited by examiner

Primary Examiner — Anne M Hines
(74) Attorney, Agent, or Firm — Price Heneveld LLP; Bradley D. Johnson

(57) ABSTRACT

A display mirror assembly for a vehicle may comprise a display module comprising a display element; a partially reflective, partially transmissive element disposed generally parallel to the display element; optical bonding adhesive having a refractive index disposed between the display element and the partially reflective, partially transmissive element; and a plurality of refracting beads having a refractive index and incorporated in or on the optical bonding adhesive; wherein the display is optically bonded to the partially reflective, partially transmissive element with the optical bonding adhesive.

9 Claims, 3 Drawing Sheets

DIFFRACTION PATTERN REDUCTION

FIELD OF THE INVENTION

This disclosure generally relates to display mirrors and more particularly, to reducing diffraction patterns in display mirrors.

SUMMARY

A display mirror assembly for a vehicle may comprise: a display module comprising a display element; a partially reflective, partially transmissive element disposed generally parallel to the display element; optical bonding adhesive having a refractive index, disposed between the display element and the partially reflective, partially transmissive element; and a plurality of refracting beads having a refractive index incorporated in or on the optical bonding adhesive; the display element may be optically bonded to the partially reflective, partially transmissive element with the optical bonding adhesive.

In some embodiments, the optical bonding adhesive may be an optical bonding film having a carrier layer and at least one adhesive layer having an outer adhesive surface; and the refracting beads may be disposed within the carrier layer. In some embodiments, the optical bonding adhesive may be an optical bonding film having a carrier layer and at least one adhesive layer having an outer adhesive surface; and the refracting beads may be disposed within at least one adhesive layer. In some embodiments, the optical bonding adhesive may be an optical bonding film having a carrier layer and at least one adhesive layer having an outer adhesive surface; and the refracting beads may be disposed between the carrier layer and the at least one adhesive layer. In some embodiments, the optical bonding adhesive may be an optical bonding film having a carrier layer and at least one adhesive layer having an outer adhesive surface; and the refracting beads may be disposed on the outer adhesive surface of the at least one adhesive layer. In some embodiments, the optical bonding adhesive may be an optical bonding liquid; and the refracting beads may be dispersed within the optical bonding liquid.

In some embodiments, the refracting beads may comprise less than 2 weight percent of the optical bonding adhesive. In some embodiments, the refracting beads may comprise less than 1 weight percent of the optical bonding adhesive.

In some embodiments, the refractive index of the plurality of refracting beads may be at least 0.04 different from the refractive index of the optical bonding adhesive. In some embodiments, the refractive index of the plurality of refracting beads may be at least 0.05 different from the refractive index of the optical bonding adhesive; at least 0.1 different from the refractive index of the optical bonding adhesive; or at least 0.15 different from the refractive index of the optical bonding adhesive. The refractive index of the refracting beads may be higher or lower than the refractive index of the optical bonding adhesive. In some embodiments, the refracting beads have an average diameter of less than five microns. In some embodiments, the refracting beads have average diameter in the range of about 1.5-2.5 microns. In some embodiments, the refracting beads have an average diameter of about 2 microns.

In some embodiments, the display element may be a liquid crystal display. In some embodiments, the partially reflective, partially transmissive element may be an electro-optic element. In some embodiments, the electro-optic element may be a dimmable mirror assembly. In some embodiments, the partially reflective, partially transmissive element may be one of an electrochromic element or a switchable mirror.

In some embodiments, the display mirror assembly may further comprise one of an anti-glare surface or an anti-glare film disposed on a front surface of the display element, and the partially reflective, partially transmissive element may be optically bonded to the anti-glare film or anti-glare surface of the display element. In some embodiments, the display mirror assembly may further comprise an anti-glare film disposed on a front surface of the display element, and the partially reflective, partially transmissive element may be optically bonded to the anti-glare film of the display element; and an absorbing polarizing film may be incorporated into the anti-glare film.

In some embodiments, the display mirror assembly may be characterized by having a transmission haze that is scattered at an angle greater than 2.5 degrees from the incident light of between 50 and 70% in the optical bonding adhesive.

In some embodiments, an optical bonding adhesive may comprise a plurality of refracting beads having a refractive index; wherein the optical bonding adhesive has a refractive index that is at least 0.04 different from the refractive index of the refracting beads. In some embodiments, the refractive index of the plurality of refracting beads may be at least 0.05 different from the refractive index of the optical bonding adhesive; at least 0.1 different from the refractive index of the optical bonding adhesive; or at least 0.15 different from the refractive index of the optical bonding adhesive. The refractive index of the refracting beads may be higher or lower than the refractive index of the optical bonding adhesive. The plurality of refracting beads may have an average diameter of less than five microns. The refracting beads may comprise less than two weight percent of the optical bonding adhesive. The refracting beads may comprise less than one percent of the optical bonding adhesive. The optical bonding adhesive may be characterized as having a transmission haze of between 50 and 70% or a transmission haze of between 60 and 65%.

In some embodiments, a device may comprise a first substrate having a first surface; a second substrate having a second surface generally parallel to and opposed to the first surface; optical bonding adhesive having a refractive index disposed on one of the first and second surfaces; and a plurality of refracting beads having a refractive index and incorporated in or on the optical bonding adhesive; wherein the first surface of the first substrate is optically bonded to the second surface of the second substrate by the optical bonding adhesive. The refractive index of the plurality of the refracting beads may differ from the refractive indices of the first substrate and the second substrate by at least 0.04. In some embodiments, the refractive index of the plurality of refracting beads may be at least 0.05 different from the refractive index of the optical bonding adhesive; at least 0.1 different from the refractive index of the optical bonding adhesive; or at least 0.15 different from the refractive index of the optical bonding adhesive. The refractive index of the refracting beads may be higher or lower than the refractive index of the optical bonding adhesive.

DETAILED DESCRIPTION

Figure 1:
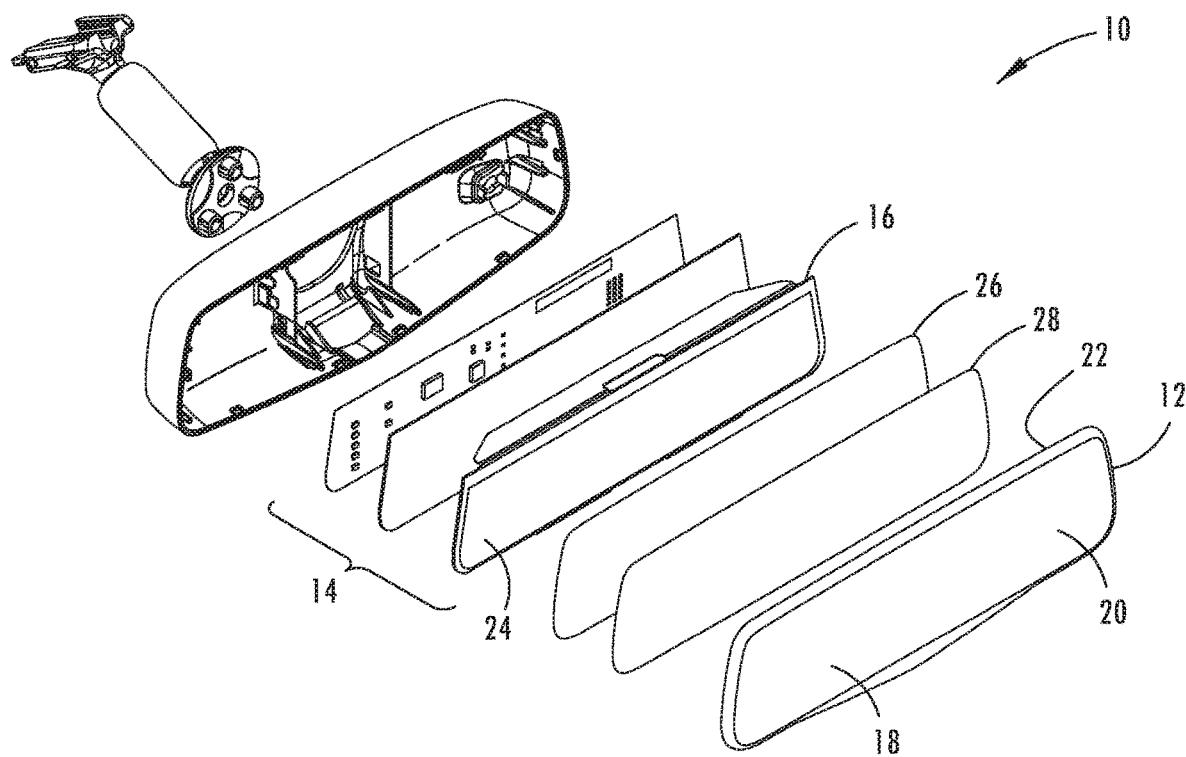
FIG. 1 is a partially exploded top perspective view of a display mirror assembly for a vehicle.

The present illustrated embodiments reside primarily in combinations of method steps and apparatus components related to a rearview mirror assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 2:
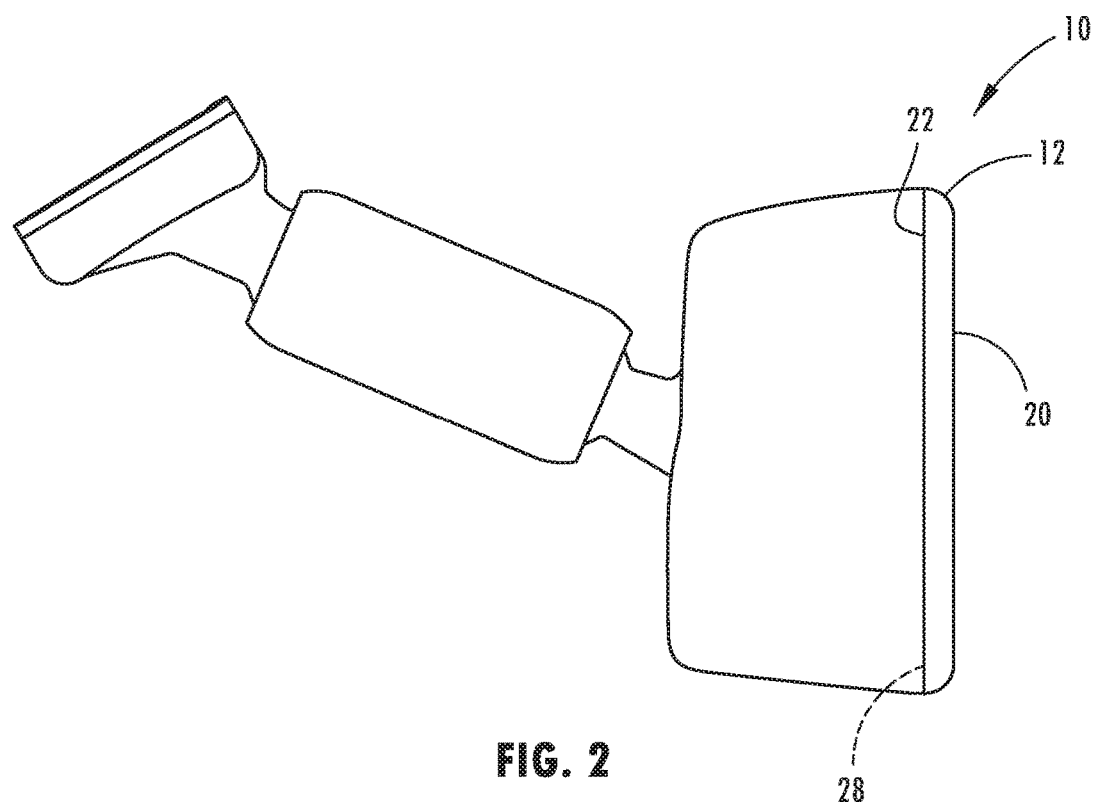
FIG. 2 is a side elevation view of the display mirror assembly of FIG. 1.

Referring now to FIGS. 1-2, reference numeral 10 generally designates a display mirror assembly for a vehicle. Display mirror assembly 10 may include a partially reflective, partially transmissive element 12 and a display module 14 that may be viewed through partially reflective, partially transmissive element 12. Partially reflective, partially transmissive element 12 may comprise an electrochromic or electro-optic element, and may be characterized by having selectively high transmission, such as a dimmable mirror assembly or a switchable mirror assembly. Display module 14 can include various types of display elements 16, including, but not limited to, a liquid crystal display (LCD). Display mirror assembly 10 may have a generally planar viewing area 18, which includes a front surface 20 of partially reflective, partially transmissive element 12. Display element 16 may be generally parallel to partially reflective, partially transmissive element 12.

In some rearview mirrors, when display element 16 is viewed through partially reflective, partially transmissive element 12, any glare on partially reflective, partially transmissive element 12 may interfere with the visibility of display element 16. This may be especially true when display mirror assembly 10 is being used during night time driving conditions and point light sources such as headlights from a trailing vehicle (i.e., a vehicle driving behind the vehicle with display mirror assembly 10) may cause a glare which may be visible to the driver. During daytime driving conditions, ambient scene reflections can cause a glare which may be visible to the driver. To prevent or reduce glare, a front surface 24 of display element 16 may have an anti-glare surface or anti-glare film 26 disposed thereon. In some embodiments, anti-glare film 26 may be incorporated into an absorbing polarizing film disposed on front surface 24 of display element 16.

Figure 3:
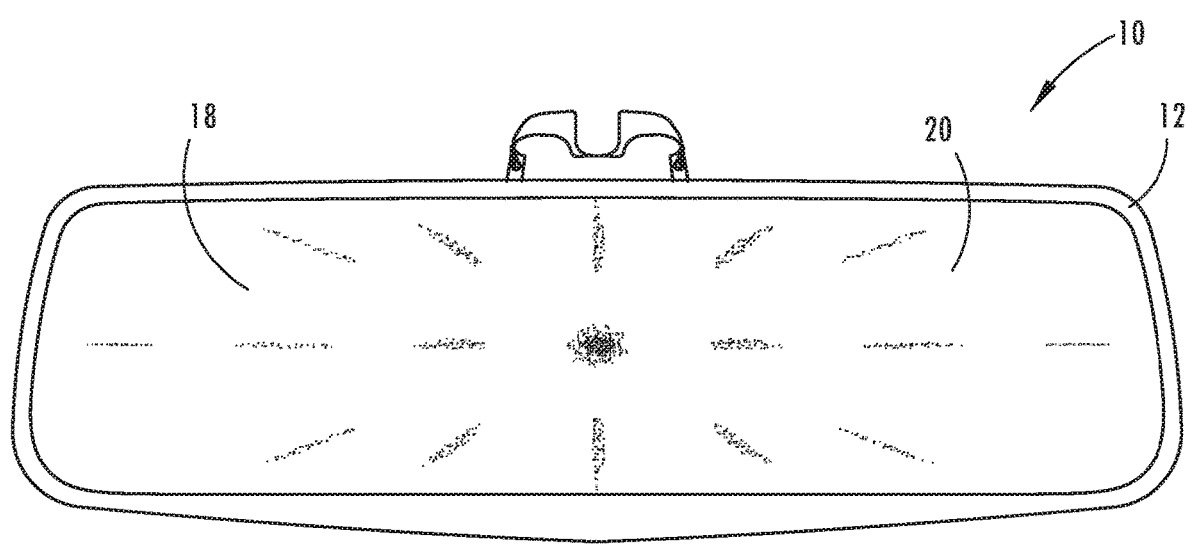
FIG. 3 is a front view of the display mirror assembly of FIG. 1 exhibiting diffraction patterns.
Figure 4:
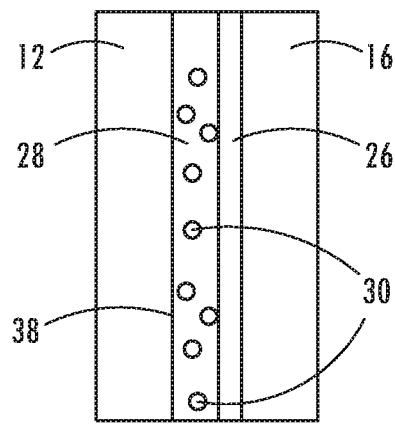
FIG. 4 is a cross-sectional view of a portion of an embodiment of the display mirror assembly of FIG. 1 showing an optical bonding adhesive.
Figure 5:
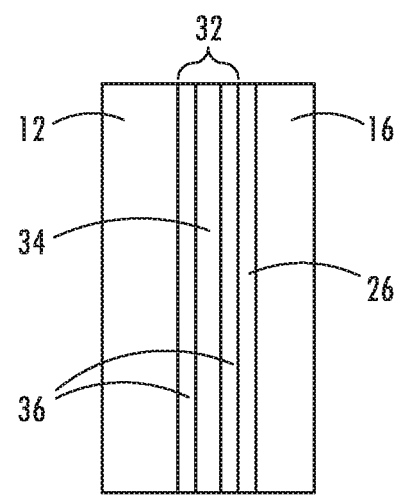
FIG. 5 is a cross-sectional view of a portion of an embodiment of the display mirror assembly of FIG. 1 showing an optical bonding film.

Front surface 24 of display element 16 may be optically bonded to a rear surface 22 of partially reflective, partially transmissive element 12 with an optical bonding adhesive 28 as shown in FIGS. 4-9. In some embodiments, the optical bonding may be between rear surface 22 of partially reflective, partially transmissive element 12 and anti-glare surface or anti-glare film 26 of display element 16. Without optical bonding, an air gap may be present in a space between display element 16 and partially reflective, partially transmissive element 12. Optical bonding adhesive may at least partially eliminate such air gap, thereby eliminating two reflective surfaces, front surface 24 of display element 16 and rear surface 22 of partially reflective, partially transmissive element 12. The optical bonding reduces overall reflectance of display element 16, thereby improving visibility of images shown in display element 16, and may higher light transmission and improved device durability. In the absence of the advantages provided by embodiments of the present disclosure, however, optical bonding may reduce the effectiveness of anti-glare surfaces or anti-glare coatings which may, in turn, cause unwanted diffraction patterns to appear in display element 16, as shown in FIG. 3.

Diffraction patterns may interfere with the visibility of what is being viewed through display mirror assembly 10. This may occur in situations in which display mirror assembly 10 is operating in a low reflectance or high transmission mode. This may occur, for example, when display element 16 of display mirror assembly 10 is in use, and is viewed through partially reflective, partially transmissive element 12. Diffraction patterns may also be visible when display mirror assembly 10 is in a dim mirror mode, such as when partially reflective, partially transmissive element 12 of display mirror assembly 10 is an electrochromic mirror being used during night time driving conditions. In this case, display mirror 10 may be dimmed and display element 16 may not be in use. Headlights from a trailing vehicle may be reflected in display mirror 10. Under these circumstances, the reflected headlights may be more likely to cause unwanted diffraction patterns, particularly in display mirrors, contributing to an overall diminished mirror performance.

To reduce or eliminate the appearance of diffraction patterns in mirror assembly 10, a plurality of refracting beads 30 may be incorporated in or on optical bonding adhesive 28. Addition of refracting beads 30 to optical bonding adhesive 28 may provide light scattering to reduce diffraction patterns, thereby increasing overall mirror performance. In some embodiments, advantageous light scattering may be provided by including refracting beads 30 that have a refractive index different from the refractive index of optical bonding adhesive 28. The refractive index of refracting beads 30 may be either higher or lower than the refractive index of optical bonding adhesive 28. Optical bonding adhesive 28 may have a refractive index identical or similar to the refractive indices of display element 16 and viewing area 18 of partially reflective, partially transmissive element 12. The refractive index of refracting beads 30 may be at least 0.04 higher or lower than the refractive index of optical bonding adhesive 28, at least 0.05 higher or lower than the refractive index of optical bonding adhesive 28, or at least 0.1 higher or lower than the refractive index of optical bonding adhesive 28. As the refractive index of refracting beads 30 approaches the refractive index of optical bonding adhesive 28, the inclusion of an increasing number of refracting beads 30 may achieve satisfactory light scattering results. A refractive index may be measured with $\lambda = 589$ nm.

By way of explanation and not limitation, refracting beads 30 may be irregular in shape, or they may have a substantially round or spherical orientation. Refracting beads 30 may have an average length or diameter of less than 10 microns, less than 5 microns, in the range of about 1.5-2.5 microns, or about 2 microns. At this size, refracting beads 30 cannot be seen by a viewer of display mirror assembly 10, but are sufficiently large to scatter light, thereby reducing or eliminating diffraction patterns. Selection of properly sized beads can be accomplished by sieving beads through successive screens of progressively smaller aperture sizes to obtain a desired size or range of sizes.

Refracting beads 30 may be formed of glasses, polymers, ceramics, organics, inorganics, salts and other suitable nonconductive materials, or combinations thereof that provide beads with a suitable refractive index. For example, refracting beads 30 may be substantially composed of an acrylic material such as polymethyl methacrylate. In some embodiments, a plurality of different beads may be used. The beads may be present in similar or different proportions. Examples of suitable refracting beads 30 may include MBX series acrylic beads from Sekisui Techpolymer, SBX series polystyrene beads from Sekisui Techpolymer, SI series polymethyl silsesquioxane beads from AICA Kogyo Ganzpearl, and EMB series borosilicate glass beads from Potters Industries.

Figure 6:
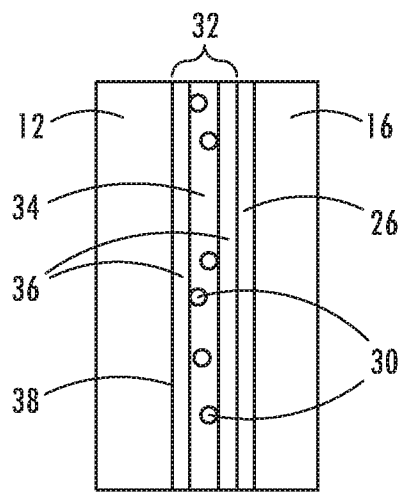
FIG. 6 is a cross-sectional view of an optical bonding film of the display mirror assembly of FIG. 1 having refracting beads disposed within the optical bonding film.
Figure 7:
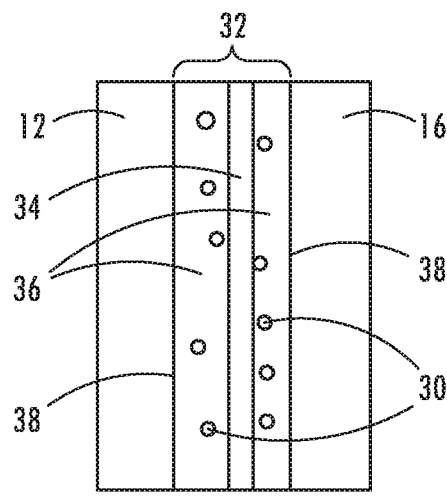
FIG. 7 is a cross-sectional view of embodiments of an optical bonding film of the display mirror assembly of FIG. 1 having refracting beads disposed within the film.
Figure 8:
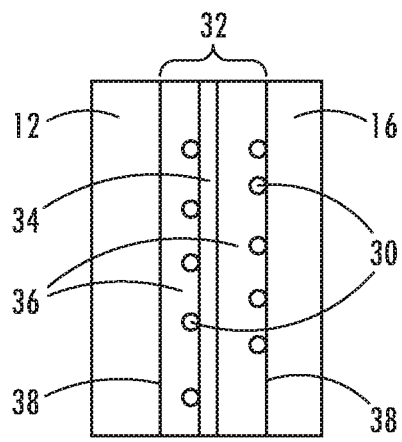
FIG. 8 is a cross-sectional view of an optical bonding film in the display mirror assembly of FIG. 1 having refracting beads disposed within the film.

In some embodiments, optical bonding adhesive 28 may be an optical bonding film 32 as shown in FIGS. 5-8. Optical bonding film 32 may be two or three layers, with a carrier 34 as a first layer and an adhesive layer 36 having an outer adhesive surface 38 disposed on one or both sides of carrier 34. In some embodiments, adhesive layer 36 or layers may be at least 100 microns thick. In some embodiments, the plurality of refracting beads 30 may be disposed within film 32. Refracting beads 30 may be disposed within carrier layer 34 as shown in FIG. 6. In some embodiments, refracting beads 30 may be disposed within one or both adhesive layers 36 as shown in FIG. 7. In some embodiments, refracting beads 30 may be disposed between at least one adhesive layer 36 and carrier layer 34 as shown on the left side of FIG. 8. In some embodiments, refracting beads 30 may be disposed on and adhere to outer adhesive surface 38 of at least one of adhesive layers 36 as shown in the right side of FIG. 8. Refracting beads 30 may be randomly distributed on adhesive layer or layers 36. This may be done using a dispenser to achieve the desired coverage. Additionally or alternatively, refracting beads 30 may be printed onto a surface of one of adhesive layers 36, using a three-dimensional printing technique or other like additive manufacturing process.

Optical bonding film 32 may comprise, for example, acrylic or urethane adhesives. Acrylic refracting beads 30 may be used with a non-acrylic optical bonding film 32, such as a urethane, to ensure that the respective refractive indices of refracting beads 30 and optical bonding adhesive 28 differ sufficiently to allow the scattering of light from point light sources. Non-acrylic refracting beads 30 may be used with an acrylic optical bonding film 32, or a non-acrylic optical bonding film 32 such as a urethane optical bonding film.

Figure 9:
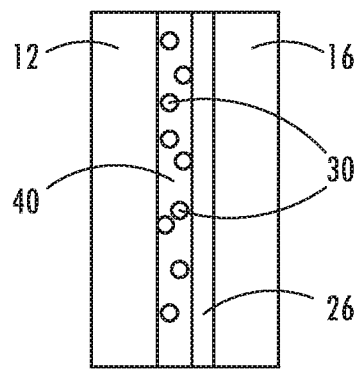
FIG. 9 is a cross-sectional view of refracting beads in optical bonding liquid in the display mirror assembly of FIG. 1.

In some embodiments, optical bonding adhesive 28 may be an optical bonding liquid 40 at the time of application. Refracting beads 30 may be dispersed within optical bonding liquid 40 as shown in FIG. 9. Some embodiments may have less than five weight percent refracting beads 30, including less than two weight percent refracting beads 30, less than or equal to about one weight percent refracting beads 30, and about 0.5 weight percent refracting beads 30. Such inclusion may result in a significant reduction in observed diffraction patterns without an objectionable haze. The weight-percent indicates the total weight of refracting beads 30 as a percentage of the sum of the weight of optical bonding liquid 40 and refracting beads 30.

Optical bonding liquids 40 may comprise, for example, silicone or acrylic adhesives. Embodiments including acrylic refracting beads 30 may also include optical bonding liquid 40 comprising a silicone adhesive. Embodiments including non-acrylic refracting beads 30 may also include optical bonding liquid 40 comprising either an acrylic or a silicone adhesive.

In some embodiments, optical bonding liquids 40 may be cross-linked with other components. After cross-linking, optical bonding liquids 40 may be a solid.

Some embodiments may include a number of refracting beads 30 disposed on a surface 38 of or within optical bonding adhesive 28 sufficient to produce a transmitted or transmission haze of between 50 and 70%. Some embodiments may produce a transmission haze between 60 and 65%, and some may produce a transmission haze of about 62.7%. Transmission hazes between 50 and 70% may allow a clear view of the image shown in display mirror assembly 10 without clouding visible to a user while reducing or eliminating diffraction patterns in display mirror assembly 10. Transmission haze may be characterized as light that is scattered at an angle great than 2.5 degrees from the incident light, and may be measured with a HazeGard™ produced by BYK-Gardner®.

It will be appreciated that embodiments of the disclosure described herein may be comprised of one or more conventional processors and unique stored program instructions that control one or more processors to implement, in conjunction with certain non-processor circuits, some, most, or all of the functions of a display mirror assembly 10, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

What is claimed is:

1. A display mirror assembly for a vehicle comprising:
    a display module comprising a display element;
    a partially reflective, partially transmissive element disposed generally parallel to the display element;
    an optical bonding adhesive film comprising at least two layers including a carrier layer and at least one adhesive layer having an outer adhesive surface, the optical bonding adhesive film having a refractive index; and
    a plurality of refracting beads having a refractive index, the refracting beads are at least one of:
        disposed within the at least one adhesive layer,
        disposed between the carrier layer and the at least one adhesive layer, and
        disposed on the outer surface of the at least one adhesive layer;
    wherein the optical bonding adhesive film is disposed between the display element and the partially reflective, partially transmissive element; and
    wherein the display element is optically bonded to the partially reflective, partially transmissive element by the optical bonding adhesive film.

2. The display mirror assembly of claim 1, wherein the refracting beads comprise less than or equal to about 1 weight percent of the optical bonding adhesive film.

3. The display mirror assembly of claim 1, wherein the refractive index of the plurality of refracting beads is at least 0.05 different from the refractive index of the optical bonding adhesive film.

4. The display mirror assembly of claim 1, wherein the refractive index of the plurality of refracting beads is at least 0.1 different from the refractive index of the optical bonding adhesive film.

5. The display mirror assembly of claim 1, wherein the refracting beads are generally spherical and have an average diameter of less than five microns.

6. The display mirror assembly of claim 5, wherein the refracting beads are generally spherical and have an average diameter in the range of about 1.5-2.5 microns.

7. The display mirror assembly of claim 1, further comprising one of an anti-glare surface and an anti-glare film disposed on a front surface of the display element; wherein the partially reflective, partially transmissive element is optically bonded to the anti-glare surface or anti-glare film of the display element.

8. The display mirror assembly of claim 1, further comprising an anti-glare film disposed on a front surface of the display element; wherein an absorbing polarizing film is incorporated into the anti-glare film; and wherein the partially reflective, partially transmissive element is optically bonded to the anti-glare film of the display element.

9. The display mirror assembly of claim 1, wherein the display mirror assembly is characterized as having a transmission haze of between 50 and 70% in the optical bonding adhesive film.

* * * * *